Aug. 1, 1933.     C. N. MITCHELL     1,920,423
COMPOSITE STEERING WHEEL
Filed Feb. 5, 1929
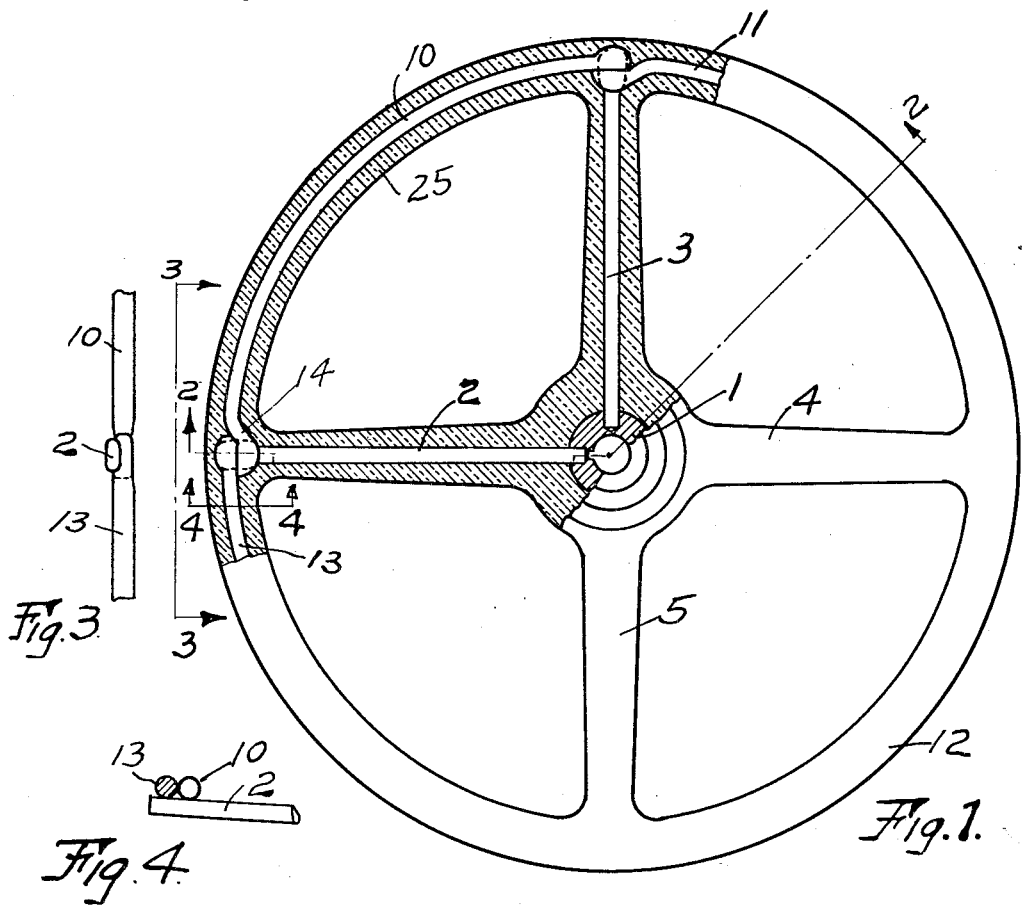
INVENTOR.
COURTNEY N. MITCHELL
BY
Fay, Oberlin & Fay
ATTORNEYS.

Patented Aug. 1, 1933

1,920,423

UNITED STATES PATENT OFFICE 1,920,423

COMPOSITE STEERING WHEEL

Courtney N. Mitchell, Cleveland Heights, Ohio, assignor, by mesne assignments, to The J. & M. Machine Company, Cleveland, Ohio, a Corporation of Ohio Application February 5, 1929. Serial No. 337,593

4 Claims. (Cl. 74—33)

The principal object of this invention is the provision of a simple and inexpensive structure of the type described in which the spoke members are made of round or elliptical material which is particularly advantageous from the standpoint of molding the hard rubber cover. Another object is to provide a means of forming the round or elliptical spoke members so as to provide an offset or sharply dished form of wheel adjacent the hub. Another object is to provide a wheel having a rim made of short sections of round or elliptical stock easily handled and formed and which permits the rim section to be made of a different size and kind of material than the spoke members. A still further object is to provide a wheel having standard rim elements which may be applied in the structure of wheels having a variety of spoke and hub forms. Another object is to provide a wheel free from recesses and air pockets which cause much trouble and loss in the process of molding the hard rubber covers.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Fig. 1 is a plan view partially in section of my improved wheel; Fig. 2 is a section on line 2—2 of Fig. 1; Fig. 3 is a view of the frame structure only of Fig. 1, as indicated by line 3—3; Fig. 4 is a section on line 4—4 showing the relative positions of rim and spoke members before welding; Fig. 5 is an external view of the development of an alternative structure in which the spoke and rim elements are arranged somewhat differently than in Figs. 3 and 4; Fig. 6 shows the arrangement of the spoke and rim members before being subjected to the welding operation; and Fig. 7 is a view on line 5—5 of Fig. 6.

The present invention is particularly adaptable to steering wheels of motor vehicles in which great strength, both in torsion and bending, is required, and in which no dependence is placed on welded joints where the maximum stress comes at the hub. This wheel has great strength in supporting an axial load at the rim and will undergo an unusual amount of bending before fracture, which is particularly advantageous in preventing fatal accidents resulting from the driver of a motor vehicle being thrown against and injured by the broken elements of the ordinary steering wheel.

In past wheels of this character the metal frames have been made from flat or rectangular stock which permit of small recesses in which air is trapped when the rubber covering, in a plastic condition, is placed on it in the mold. This air expands under high pressure when the rubber is cured in furnaces and causes the rubber to cleave away from the adjacent metal and at times to form noticeable recesses in the rubber itself. Another difficulty encountered with wheels using flat or rectangular sections is the shifting of the frames when the molds are closed under the high pressures invariably used, the flat or rectangular form not permitting the plastic material to flow freely around as is the case of round or elliptical stock and thus causing the flat or rectangular sections to be submitted to very high lateral pressures which spring them out of position, frequently causing the metal frame to be exposed through the rubber covering.

This type of construction has a great advantage over metal structures heretofore used, these having sharp corners and irregular forms, in that the rubber, having a different coefficient of expansion than the frame, the sharp edges and irregular forms cause expansion cracks in the rubber which are eliminated by the use of this type of wheel frame. This difficulty is very noticeable in cold climates where vehicles are driven in and out of heated garages when the outside temperature is very low.

Referring now to Figs. 1 and 2, there is shown a central hub 1, which is preferably of metal and which is provided with a series of equidistantly spaced radially extending recesses in its outer surfaces. Disposed in these recesses are a series of metallic radially extending spokes 2, 3, 4 and 5. At their inner ends, the spokes are provided with a curved portion 6 which brings the body of the spoke proper into a plane spaced from the plane of engagement of the spokes in the recesses, thus allowing the recesses to be in a position in the hub which will permit of the mounting at the upper part of the hub of the usual control mechanism for lights, horn, etc.

The frame of my improved wheel is built up by mounting the spokes 2, 3, 4 and 5 in the central hub as described and then arranging between the outer ends of the spokes curved members 10, 11, 12 and 13, each of these curved members extending between two adjacent spokes. At their ends these parts may be engaged with the spokes in various ways, illustrated in Figs. 3, 4, 5, 6 and 7. In the construction shown in Figs. 1, 3 and 4 the members 13 and 10 are disposed side by side, either on top or below the spoke member 2. In Fig. 4 these are shown as resting on top of this spoke member and the three elements may then be secured together by welding them, while at the same time applying a sufficient pressure to flow the heated metal into the form shown in Fig. 3, in which the spoke 2 has been flattened, as have also the ends of the members 10 and 13. In order to bring the rim members into substantial alignment I form either one or both of these members with a curved end. In Fig. 1 the rim member 10 is shown provided with a curved neck 14 adjacent to the end which is engaged against the end of the member 13.

In Fig. 6 I have shown a similar arrangement of the rim and spoke members, in which, however, the spoke member 20 is interposed between rim members 21 and 22. These members, when welded and flowed by the welding action, produce a rim and a joint of the form shown in Fig. 5, in which the spoke member 20 has been materially flattened and the ends of the rim members 21 and 22 have also been flattened to produce a joint having but slightly more than the normal thickness of any one of the three elements which are thus engaged.

After the assembly of the wheel frame as described above it is coated substantially uniformly with some plastic material, such as rubber 25, and is then vulcanized in suitable molds, causing the plastic material to harden and to completely enclose in a single unitary casing the entire metallic frame of the wheel.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a wheel of the character described, the combination of a hub, a series of metallic spokes permanently secured to said hub at one end and extending radially outward therefrom, and a series of curved rim members each extending between two adjacent spokes, said rim members at their ends being overlapped and distorted to bring the rim members proper into substantially the same circumferential plane, and said overlapped portion of said rim members being permanently secured to the outer ends of said spokes.

2. In a wheel of the character described, the combination of a hub, a series of metallic spokes secured thereto, each of said spokes being provided with a flattened end portion, rim members extending between the outer ends of said spokes and having flattened ends engaging against the flattened ends of said spokes, said spokes and rim members being permanently secured together to form a unitary structure.

3. In a wheel of the character described, the combination of a hub, a series of metallic spokes secured thereto, each of said spokes being provided with a flattened end portion, rim members extending between the outer ends of said spokes, and having flattened ends engaging against the flattened ends of said spokes, said spokes and rim members being permanently secured together to form a unitary structure and said entire structure being provided with a non-metallic enclosing coating.

4. In a wheel of the character described, the combination of a hub, radially arranged metallic spokes having their outer ends lying in a plane spaced from the inner ends, said hub and spokes being interlockingly engaged, and a rim member extending circumferentially between the ends of said spokes and being permanently secured thereto, said rim member and spokes at their points of juncture being compressed to approximate the thickness of said spokes.

COURTNEY N. MITCHELL.